United States Patent

[11] 3,631,654

[72] Inventors Phyllis Riely
Massapequa, N.Y.;
Robert Skyles, Glenview, Ill.
[21] Appl. No. 764,694
[22] Filed Oct. 3, 1968
[45] Patented Jan. 4, 1972
[73] Assignees Pall Corporation
Glen Cove, N.Y.
by said Riely;
Baxter Laboratories, Inc.
Morton Grove, Ill., by said Skyles

[54] GAS PURGE DEVICE
17 Claims, 5 Drawing Figs.
[52] U.S. Cl. .................................................. 55/159,
55/324, 55/522, 55/524, 210/500
[51] Int. Cl. ................................................ B01d 46/54
[50] Field of Search .......................................... 55/159,
185, 522, 524, 307, 321–324, 337, 158; 210/433,
504, 508, 500

[56] References Cited
UNITED STATES PATENTS
| | | | |
|---|---|---|---|
| 1,062,942 | 5/1913 | Woods ........................ | 210/433 X |
| 3,371,468 | 3/1968 | Shropshire .................. | 55/158 |
| 3,394,533 | 7/1968 | Li et al. ...................... | 55/337 |
| 3,149,758 | 9/1964 | Bush et al. .................. | 222/189 |
| 3,520,416 | 7/1970 | Keedwell ..................... | 210/508 X |

*Primary Examiner*—John Adee
*Attorneys*—John R. Jones and Leland L. Chapman

ABSTRACT: Apparatus is provided for separating gases and liquids and particularly for removing and venting gases contained in liquids. The separation is obtained by interposing a filter which is wetted by liquid across the liquid outlet line; this filter passes the liquid but repels the gas. Another portion of the same filter is liquid repellent, and is interposed across a gas outlet line; this passes the gas to a vent, and repels the liquid.

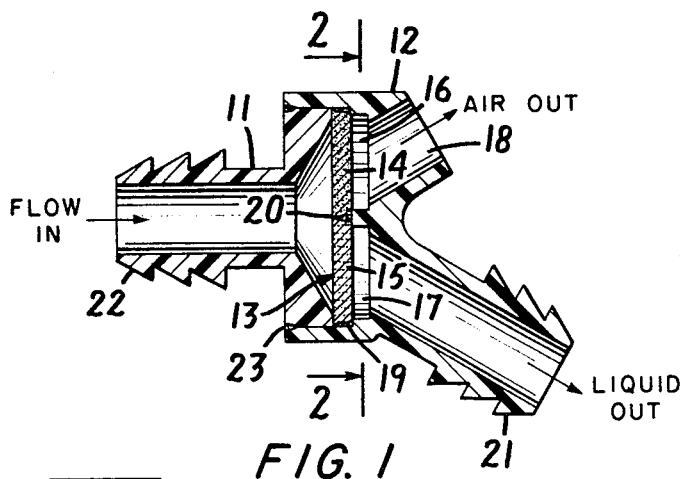
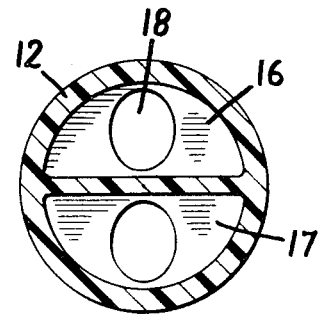
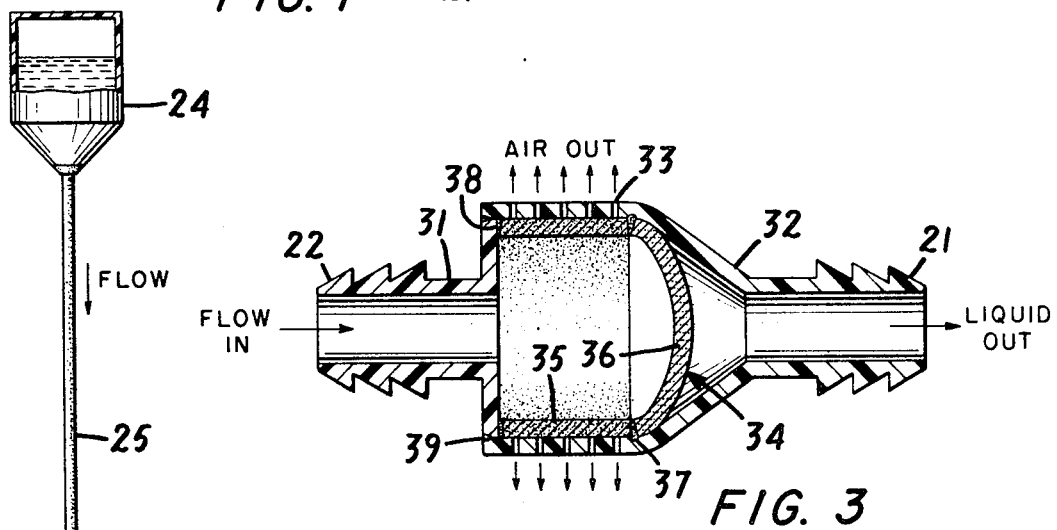
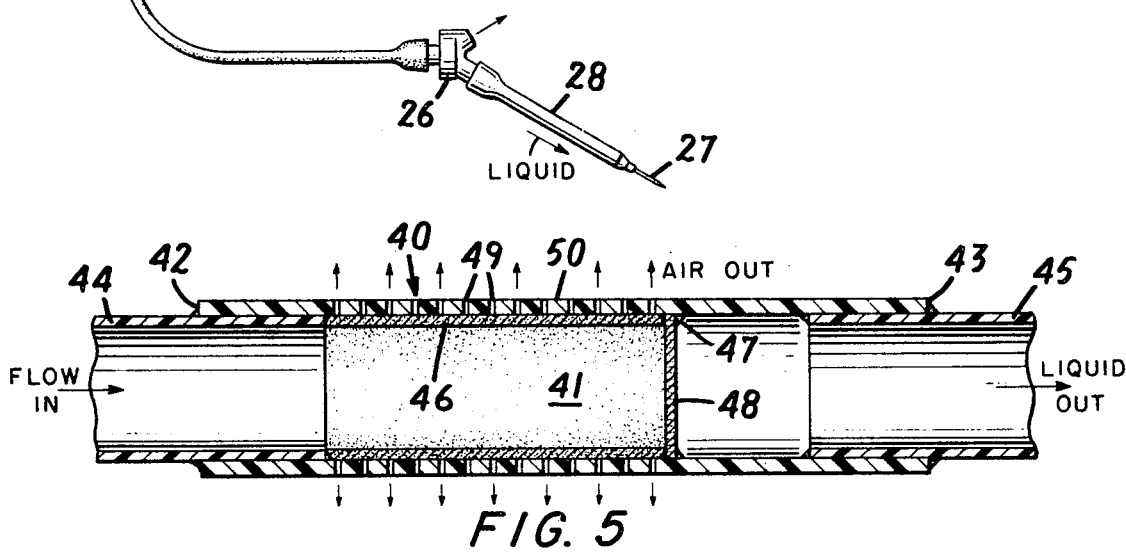

GAS PURGE DEVICE

This invention provides a gas purge device that is capable of separating gases and liquids, and more particularly for separating and venting gases from liquids, and employs a filter, one portion of which is wetted by and passes the liquid and is gas-repellent when saturated with liquid, and another portion of which is liquid-repellent and is capable of passing the gas, so that only liquid passes through the liquid-wetted portion of the filter, and only gas passes through the liquid-repellent portion of the filter.

In many types of medical treatment, such as blood transfusions, intravenous feeding, and the like, it is necessary to introduce liquids into a patient, sometimes in rather large amounts. When this is done, it is quite important that absolutely no air be permitted to pass into the patient with the liquid, because of the danger of an embolism, with possibly fatal consequences. Before such an injection usually can be carried forward, therefore, it is necessary to clear the line of air, and exclude air from the system thereafter. This is not easy to do, however; there is always the danger that air can enter the system during administration, since the system can hardly be easily assembled and disassembled, and still be completely airtight, and there is also the possibility of human error in such assembly. The danger increases if a large volume of fluid is to be injected. If the reservoir runs dry, there is also again a danger that air will be injected. These are especially dangerous problems when the liquid is being injected under pressure, using, for instance, a mechanical pump.

A filter having small pores is incapable of passing gases at fluid pressures below the so-called bubble point of the material, when the filter is filled with liquid. The bubble point is defined as the characteristic pressure at which the first bubble of air appears when a filter material is pressurized with air, while immersed just under the surface of the liquid. The bubble point effect is described in U.S. Pat. No. 3,007,334, dated Nov. 7, 1961, and makes it possible to determine the maximum pore size of filter elements, since the air pressure at the bubble point can be directly correlated with the pore size of the filter.

It is apparent that if a filter saturated with fluid is interposed in the line leading from a liquid supply to a patient, air cannot pass along the line beyond the filter, so long as the fluid pressure is below the bubble point of the filter. Such devices have therefore been proposed to prevent the accidental passage of air to patients. However, the problem with such devices is that although they block the passage of air, they do not vent it, with the result that the air held back by the filter can cover the surface of the filter, restricting flow, or even blocking it, if the surface is completely covered with air, at the same time increasing the pressure drop across the filter, with the resultant danger that the bubble point of the filter can be reached sooner than expected, after which the blocked air can pass through virtually all at once. The presence of the filter also makes it impossible to clear the line of air, after the filter has once been wetted, and therefore the filter must be dried, before the line can be used again, so that it can be cleared of air before the next use. This, however, is a problem, particularly if the filter must be steam-sterilized or hot water-sanitized before use.

The problem is particularly troublesome with microporous filter material having pores of less than one micron in diameter. Such filters are intended to filter out harmful micro-organisms from fluids, but in such filters, the pressure differential needed to force air through the filter wetted with liquid can be as high as 30 p.s.i.d., as a result of which, complete filter blockage can result from the presence of air in sufficient quantities in the system to cover the surface of the filter.

In accordance with the instant invention, a gas purge device is provided including a filter element that contains both liquid-wetted and liquid-repellent parts, interposed across and screening separate outlets for liquid and gas. The liquid-wetted parts will pass the liquid, and the liquid-repellent parts will not be wetted by liquid, and will therefore remain open for passage of gas therethrough. The liquid-wetted and liquid-repellent parts open into separate outlets, the outlet downstream of the liquid-repellent part being a gas outlet, and the outlet downstream of the liquid-wetted part being the delivery passage for gas-free liquid from the device. In this way, the device is capable of separating gases and liquids, and of either venting the gas or delivering it to a gas collection device, while at the same time providing a gas-free supply of liquid. Blockage of the system by the buildup of a gas lock is avoided, while at the same time the entrained gas is entirely eliminated from the liquid. Thus, the device of the invention is particularly adapted for medical applications, where air must be vented from the line, and must also be absolutely prevented from reaching a patient receiving an injection of the liquid. In a preferred embodiment, the filter employed has pores less than about 0.5 micron. If harmful micro-organisms are to be filtered out from the fluid, the pores preferably should be less than about 0.3 micron, and then both the liquid and the gas passing through the device are sterilized at the same time. The device has the further advantage that the liquid-wetted or hydrophilic and liquid-repellent or hydrophobic parts can both be provided on the same filter element, thus facilitating servicing, and simplifying the construction.

The gas purge device in accordance with the invention comprises, in combination, a housing, an inlet in the housing for flow of fluid thereinto comprising gas and liquid, an outlet for delivery of liquid-free gas from the housing, and at least one filter element interposed across and screening both the gas and the liquid outlets. There is a liquid-repellent filter or part thereof interposed across and screening the gas outlet, and a liquid-wetted filter, or part thereof, interposed across and screening the liquid outlet, such that only gas can pass from the inlet through the filter into the gas outlet, and only liquid can pass from the inlet through the filter into the liquid outlet. Both the liquid-wetted and liquid-repellent filters preferably have a pore size less than about 0.3 micron, at which harmful micro-organisms cannot pass through, and both are preferably portions of the same filter element. The housing and associated parts of the gas purge device are preferably made of plastic, and are bonded or fused together in a one-piece construction. The filter element can be fixed therein, so that the entire unit is disposed of when the element needs replacement, or can be removably positioned in the housing for easy replacement when needed.

The attached drawings show preferred embodiments of the invention.

FIG. 1 represents in a cross section, one embodiment of a gas purge device in accordance with the invention, with a housing having three passages arranged in a Y-configuration;

FIG. 2 is a cross section taken along the line 2—2 of FIG. 1;

FIG. 3 is a cross-sectional view of another embodiment of gas purge device, the housing having one through passage and a plurality of gas vents encircling the housing in a narrow band;

FIG. 4 is a schematic view of the gas purge device of the invention, showing it connected to a liquid supply container and to a hypodermic needle for medical purposes;

FIG. 5 is a cross-sectional view of another embodiment, in which the housing includes a single through passage and a porous wall serving as a gas vent.

The air purge device of the invention is quite versatile, and the construction design is such that it can be adapted to meet any gas-liquid separation requirement. For medical applications, it is usually preferable to form the housing as an in-line connector to which tubing leading to a liquid supply bottle and to a hypodermic needle or other type of administration equipment can be readily attached, at the fluid inlet and liquid outlet. The gas outlet can be no more than a simple vent. The volume of the in-line connector should be as small as possible, less than 1 cc., and preferably less than 0.5 cc.

The device is also useful in chemical processes where gases and liquids must be separated at some stage of the reaction. The device is of particular application to processes where finely divided stable dispersions of liquids in gases or gases in liquids are formed, which are difficult to separate by conventional equipment, such as centrifugal and vortex separators. In such processes, not only small but also large volume devices can be employed, having volumes of up to 1,000 liters and more.

The relative proportion of available surface area for the liquid-wetted and liquid-repellent filters or parts or portions of the filter can be adjusted as required, and will depend upon the relative volumes of fluid being processed, and of the liquids and gases being passed therethrough.

In medical applications, the housing can be of either a rigid or a flexible construction. Each type of construction has certain advantages. A rigid construction, using rigid sheets or molded or cast plastic parts or tubing, or parts or tubing made of metal, make it possible for the device to resist high internal fluid pressures up to the bubble point of the filter used. The housing can also be made of flexible tubing or sheet material.

The housing can be transparent, in which case the functioning of the device and the condition of the filter can be observed without dismantling the device. The filter that is employed can of course also serve to remove suspended solid material such as dirt and other contaminants, which could lead to filter blockage. However, it is apparent that the dirt capacity of the device is not great, because the primary purpose of the device is not use as a filter, although it can of course be designed with this in mind. It is better, however, if large quantities of suspended matter are to be encountered, to employ a conventional filter upstream of the gas purge device of the invention, so as to prevent plugging of the filter in the gas purge device. The function of the filter in the device of the invention is best limited to a clean-up or polishing filter, such as in bacteria removal downstream from a high dirt capacity filter capable of removing larger size contaminants.

It will be evident from the above that the housing can be constructed of rigid plastic material that is also transparent, such as polyethylene, polypropylene, polymethylmethacrylate, polymethylacrylate, polymethyl pentene-1, polyvinyl chloride, and vinyl chloride-vinylidene chloride copolymers. Translucent materials such as polypropylene, polyethylene, urea-formaldehyde and melamine-formaldehyde polymers can also be employed. Other plastic materials that are suitable include polystyrene, polyamides, polytetrafluoroethylene, polychlorotrifluoroethylene, polycarbonates, polyesters, phenol-formaldehyde resins, polyvinyl butyral, cellulose acetate, cellulose acetate-propionate, ethyl cellulose, and polyoxymethylene resins.

Metal housings can be used. Suitable metals include stainless steel, aluminum, and stainless alloys, such as nickel, chromium, vanadium, molybdenum, and manganese alloys. The housing material should of course be inert to the fluids being processed.

The filter material, of which one part or filter is liquid-repellent and one part or filter is wetted preferentially by the liquid, can have any desired pore size, according to the nature of the fluid being treated, and the nature of the contaminants, if any, to be removed. Since most filter materials are wetted by some liquids, and repel others, the materials chosen for the filter will depend upon the fluid being processed.

The filter is preferably of one material with a part or portion treated to obtain the desired modification of its wetting characteristics. If water is the liquid, then the filter material can be hydrophilic, and a portion thereof rendered hydrophobic by treatment with a water-repellent material. If the liquid is a hydrophobic liquid then the filter material can be hydrophobic and a portion thereof rendered hydrophilic.

The filter material can also be a composite of two different materials, each having the desired and opposed wetting characteristics. One material can be superimposed over open portions of the other, or placed beside it, with the edges overlapping, and the two materials bonded together for form a single composite element.

It is also possible to form the wall of the channel or tube through which the fluid passes of one of the filter materials, and treat it to introduce the opposite wetting characteristic, at the portion desired to serve as a vent for liquid or gas. The other filter material then extends across the channel or tube, and is attached to the channel or tube in a manner such that all fluid and gas must pass through the filter material and the wall.

In order to be effective in repelling and therefore not passing a gas, the liquid-wetted portion of the filter material should have a pore size of less than about 25 microns, and preferably less than about 3 microns. In order to be effective in repelling and therefore not passing a liquid, the liquid-repellent portion of the filter material likewise should have a pore size of less than about 25 microns, and preferably less than about 3 microns. Thus, the same filter can easily serve as a substrate for each portion. For bacteria removal purposes, as previously indicated, the pore size should be less than about 0.3 micron, and preferably less than 0.2 micron. A filter material that has too large a pore size can have the pore size reduced by impregnation, or coating, or both, with particulate and/or fibrous material. Such materials and procedures are known.

Thus, there can be used as the filter material woven or nonwoven textile materials made of cotton, jute, sisal, hemp, flax, linen, wood fiber, metal wire, such as stainless steel, copper and aluminum, plastic filaments (monofilaments and yarn) such as nylon, polyvinyl chloride, polyacrylonitrile, esters of terephthalic acid and ethylene glycol, cuprammonium rayon, acetate rayon, viscose rayon and polyvinylidene chloride; sintered composites made from metal powder or particles, such as stainless steel, copper, bronze, or monel, or from plastic particles, such as polyvinyl chloride, nylon, polyethylene, polypropylene, polytetrafluoroethylene, and polyfluorotrichloroethylene; glass and ceramic materials; papers of various types, made up of cellulose fibers, cellulose cloth, plastic fibers, such as polyvinyl chloride, cellulose acetate, polyvinylidene chloride, nylon, and any of the other plastic filaments mentioned above, taken singly or in any combination; and microporous sheets, such as synthetic resin and cellulose derivative membrane filters.

Impregnated and/or coated microporous filter sheet materials meeting these general requirements and that in particular can be made with less than 0.3 micron pores and thus are useful for the removal of harmful micro-organisms include the microporous materials of U.S. Pats.; No. 3,158,532 to Pall et al. dated Nov. 24, 1964; No. 3,238,056 to Pall et al. dated Mar. 1, 1966, No. 3,246,767 to Pall et al. dated Apr. 19, 1966, and No. 3,353,682 to Pall et al. dated Nov. 21, 1967. Also useful for this purpose are microporous ceramic filters and the microporous membrane filters described in U.S. Pats.; No. 1,421,341 to Zsigmondy, No. 1,693,890 and No. 1,720,670 to Duclaux, No. 2,783,894 to Dovell, No. 2,864,777 to Robinson, and No. 2,944,017 to Cotton.

Liquid repellency in a selected portion is obtained, if the filter is of a material that is wetted by the liquid, by treatment of that portion of the material with a material that repels the liquid when disposed on the surfaces of the pore walls of the filter material. The repellent material can be applied from a solution or dispersion thereof, in a solvent or dispersant, which desirably includes a binder, to retain the repellent on the pore wall surfaces, unless the repellent is reactive therewith, and can bond itself thereto.

The application can be by printing, spraying, coating, impregnating, dipping, or by exposure to a vapor, such as that of a low boiling silicone compound. It is necessary to use a technique that results in thorough treatment of the entire length of the pores, from surface to surface of the filter material. This requires impregnation of the wall surfaces of the pores from end to end, best achieved by allowing the solution or dispersion of the repellent to flow into and through the pores in the treated zone, by capillarity or by pressure application.

It will be appreciated that in nonwoven substrates, such as paper, nonwoven bats, and microporous layers formed by laydown from a fluid dispersion, the through pores that extend from one surface to another are composed of interconnected pores which are the interstices between the particulate material of which the material is made.

The amount of repellent that is required depends upon the effectiveness of the material as a repellent, and the volume of pores being treated. Usually less than 25 percent by weight of the volume being treated and preferably from 0.025 percent to 15 percent by weight of the volume being treated is sufficient.

The repellent is chosen according to the liquid suspending medium being filtered. It must repel such liquid, or be rendered so in situ on the pore surface.

For a hydrophobic or water-repellent surface, there can be used silicone resins and silicone oils of the general type $R_n-Si-O-Si-R_n$, where $n$ is 1 or 2. $n$ is 1 in the case of the fluids, and $n$ is 2 in the case of the solids, which contain crosslinks between chains. Mixtures containing species in which $n$ is from 1 to 3 can also be used. R is a hydrocarbon group having from one to 18 carbon atoms.

Also useful are the quaternary ammonium salt derivatives of silicone compounds described in U.S. Pat. No. 2,738,290, dated Mar. 13, 1956. These are substantive to cellulosic filter materials, as noted in the patent. Also, the hydrophobic oils and waxes can be used, in appropriate circumstances, where they can be made permanent.

If the filter material is liquid-repellent, and it is desired to make a selected portion thereof liquid-wetting, it is advantageous to apply a liquid-wetted material thereto. The same treatment principles and proportions apply to liquid-wetted materials as to liquid-repellent materials. Typical wetting agents that are suitable are polyvinyl alcohol, alkyl aryl polyether alcohols, melamine formaldehyde resins, and the like. These wetting agents can be applied from a dispersion or emulsion.

The filter material or portion that is liquid-repellent and therefore passes the gas being separated from the liquid is so placed in the housing across the gas outlet that the gas can reach it and must pass through it to enter the gas outlet in the housing. Inasmuch as gases normally rise, this means that at least a part of the liquid-repellent filter preferably is at an upper portion or wall of the housing. If the liquid-repellent filter is confined to a lower portion of the housing, the air or the gas may not pass through it until an air pocket deep enough to reach the uppermost portion of the liquid-repellent filter has built up in the chamber. The building up of such a gas pocket is not a disadvantage, if the liquid-wetted filter material is still fully open to the passage of fluid, and is not covered by or immersed in the air or other gas pocket, but such a device may be position-sensitive. It is therefore less preferred, for some uses.

For convenience of construction and minimum volume, in the gas purge device of the invention, the liquid-repellent and liquid-wetted portions are on the same filter element, in close juxtaposition, but blocking different outlets of the housing. In this way all components of the fluid entering the housing must pass through either the liquid-wetted or liquid-repellent portions of the filter, before they can emerge from the housing.

If there are passages through the housing arranged in a T or Y configuration, a single filter element can be placed across the intersection of the three passages in a manner such that it is joined to the common wall between the two outlet passages in a fluidtight seal. The outer periphery of the filter is then sealed to the wall of the housing, as a result of which all fluid entering the housing from the inlet must pass through the filter into either the gas outlet or the liquid outlet, and the filter ensures that no liquid enters the gas outlet and no gas enters the liquid outlet. Using this principle of construction, it is possible to construct a device to meet any dimensional and flow requirement of the system in which it is to be placed.

It is also convenient in many cases to design the housing in an in-line form, with only one through passage, and a gas outlet in the wall thereof. The fluid enters at one end of the passage, and liquid is delivered at the other end; the L-shaped filter has one leg that extends across the passage at an intermediate point, and one leg that extends across the gas outlet, and the liquid-repellent portion is across the gas outlet, and the liquid-wetted portion across the passage.

The gas outlet in such a device can be a porous wall just upstream of the filter across the passage, and in this case the porous wall (which is a filter) is liquid-repellent and the filter is liquid-wetted.

These embodiments are illustrated in the drawings. Other variations will be apparent.

In its simplest construction, the filter element has a flat surface, or substantially so. However, in order to increase the surface area of the filter, for use in a limited space, the filter can be curved, bowed inwardly against flow or outwardly in the direction of flow, and it also can be corrugated. The filter can extend straight across the two outlets, if they are in-line, or in a Y-configuration, or it can be bent, say, in an L-shape, if the outlets are at right angles to each other, as in a T-housing, or in an in-line housing with the gas outlet in a wall of the through passage, upstream of the outlet. The filter can also be tubular, and extend all the way around the wall of the through passage in the liquid repellent portion, and have a liquid-wetted tip portion extending across the passage, as in a thimble.

For simplicity of construction, the housing is best formed in one, two or three matching pieces, which when assembled define the connected through passages, inlet and outlets, with the liquid-repellent filter material fixed across the gas outlet, and the liquid-wetted filter material fixed across the liquid outlet, and preferably parts of the same filter element. These parts can be separately molded, and then attached together, by bolts, or by heat-fusing, or by solvent- or adhesive-bonding. In the case of plastic materials, solvent-bonding is a preferred attachment technique, because it eliminates the presence of extraneous adhesives, does not effect transparency at the joints of a transparent housing, and is also leakproof.

The housing parts are constructed so that the filter materials contained therein are attached to the walls of the inlet and/or outlets, so that all fluid must pass through some part of the filter before it can emerge from the housing. The housing part containing the liquid-repellent material has a gas outlet or vent on the outside of the liquid-repellent material, and the housing part containing the liquid-wetted material has a liquid outlet communicating with the space on the outside of the liquid-wetted material. The housing thus has at least three openings, the inlet, and two outlets, to which the fluid containing both gas and liquid is delivered, for separation of the gas therefrom, and the opposite sides of the liquid-repellent and liquid-wetted materials, respectively, being adapted to vent gas separated from the liquid, and to deliver liquid from which gas has been separated.

The devices shown in the drawings illustrate three embodiments of this type of construction.

The gas purge device of FIGS. 1 and 2 comprises a disc of filter medium 13 installed in the housing 12. The disc contains a liquid-repellent or hydrophobic segment 14 and a liquid-wetted or hydrophilic segment 15. Each such segment occupies one half of the disc. The filter disc 13 is so installed that the hydrophobic segment 14 is located contiguous to a semicircular annulus 16 and the hydrophilic segment 15 is located contiguous to another semicircular annulus 17. The filter disc 13 is bonded to the housing 12 along its entire circumference at 19 and along the line that divides its two segments at 20. This prevents external leakage of fluid through the air vent port 18 and internal bypassing of either segment.

Both the inlet 11 and the housing 12 can be formed or molded of transparent polymethyl methacrylate resin, and are bonded together along the entire circumference at 23 by a solvent produced seal or an epoxy resin.

The end fittings 21 and 22 are formed such that they may be inserted into standard tubing used in medical applications and provide a leakproof connection therewith.

The filter medium is prepared as follows:

A microporous filter material in sheet form is prepared following the procedure of example I of U.S. Pat. No. 3,353,682.

The average pore size is 0.1 micron and the maximum pore less than 0.35 micron as determined by 100 percent removal of the bacteria, *Serratia marcescens*.

This material is then cut into a disc and one half thereof is treated with General Electric's RTV-112 silicone resin, to render it water-repellent or hydrophobic. The treatment is carried out by impregnation using a 5 percent solution of RTV-112 silicon resin solution in perchloroethylene, followed by evaporation of the solvent, and curing the resin at 40 percent relative humidity and at 25° C. for 18 hours. The deposition rate is approximately 0.1 cc. of solution per square centimeter of filter material, extending to the opposite side of the material.

The treated portion of the disc becomes the hydrophobic segment 14 and the untreated portion becomes the hydrophilic segment 15.

In use, fluid containing both gas and liquid enters via the inlet fitting 22. Fluid wets the hydrophilic liquid-wetted segment 15, and as soon as the pores of this material are filled, gas can no longer pass through. On the other hand, liquid does not wet the liquid-repellent segment 14 and gas is consequently free to pass through this segment, reaching the annulus 16 on the other side thereof, and being vented to the atmosphere through the air vent port 18. Liquid passing through the liquid-wetted segment 15 enters the annulus 17, whence it is delivered from the device through the outlet fitting 21.

The gas separator of FIG. 3 uses the filter medium described above, formed into a cylindrical section with a hemispherical end, the cylindrical section thereof having been silicone-treated per the above procedure. This "thimble"-shaped filter material 34 is inserted into the housing 32, such that the cylindrical hydrophobic segment 35 is located within and directly contiguous to a perforated section 33 of the housing. The filter material 34 is bonded circumferentially at 37 and 38 to prevent leakage and bypass thereof, and the inlet 31 is bonded to the housing 32 circumferentially at 39.

In use, as in the embodiment of FIGS. 1 and 2, gas and liquid enter through the inlet fitting 22. The gas passes through the hydrophobic segment 35 and is vented to the atmosphere through the perforated section 33. The liquid passes through the hydrophilic segment 36 and is discharged as gas-free liquid through the outlet fitting 21.

The gravity-fed intravenous transfusion system shown schematically in FIG. 4 utilizes one of the gas purge devices of either FIGS. 1 and 2, or 3.

Liquid usually containing entrapped air passes from the contained 24 into the tubing 25. At the gas purge device 26, the gas is purged, as described above, and vented to atmosphere. The gas-free liquid then flows via tube 28 to the hypodermic needle 27, from which it is injected into the patient.

The gas purge device of FIG. 5 has a tubular housing 40 with a single through passage 41, having an inlet 42 and an outlet 43. In the inlet 42 and outlet 43 are bonded two supply tubes 44 and 45 by a solvent-produced seal. The housing is formed of transparent polyethylene, and the tubing is also of polyethylene.

The housing portion 50 is microporous, and comprises a perforated ring entirely encircling the housing with a filter material 46 bonded thereto. The filter is like that of FIGS. 1 and 2, treated with silicone resin to render it water repellent. This portion 46 thus serves as a gas vent.

Across the housing 40 at one side of the center is bonded a filter disc 48 of the same type as the portion 46, but without the silicone resin treatment. This disc is also bonded to the walls of the housing by an adhesive 47. Thus, all fluid entering inlet 42 from tube 44 must pass through either filter 46 or filter 48, to leave the housing.

In use, fluid containing gas and liquid enters the gas purge device at inlet 42, and flows through the passage 41 to filters 46, 48. Liquid passes through hydrophilic filter 48, and leaves the separator at outlet 43. Gas cannot pass through the filter 48, but it does pass through hydrophobic filter 46, which in turn blocks the liquid. Gas enters the holes 49 of the housing 40, and is vented thereby to the atmosphere.

This device is very small, less than 1 cc. in volume, and can easily be strapped or otherwise attached to the limb of a patient, for use in administration of some fluid medicament.

The gas purge devices shown in the drawings as described above are useful to separate gases from liquids in any type of medical and chemical application. They can, for instance, be used both to clear a line of air and to prevent the introduction of air into a patient receiving an injection of any type of fluid medicament, such as a parenteral fluid, blood transfusions, blood plasma, intravenous feeding solutions, and the like. Such fluids can be delivered to a patient under gravity pressure, or under higher pressures, such as encountered when the fluid delivery is effected by means of a syringe pump, and will prevent the introduction of air into the patient, at all pressures below the bubble point of the liquid-wetted filter material that is used, both at the beginning of the introduction of the liquid, even when the line before the device contains air, and after delivery of fluid has exhausted the supply. The separated gas need not be vented but can, if desired, be connected into a gas reclamation line leading to a concentrator or storage tank.

The devices are also useful in the gravity-free separation of gases and liquids, such as in outer space, beyond the influence of earth gravity, and they can be used to remove gases from the liquids entraining them, in any type of chemical process, such as in the separation of hydrogen and other reactive gases from liquids, in hydrogenation and other gas-reactant reactions. Because they require no electrical power or other source of power, they are more versatile than centrifugal separators, and because of their small, compact size, they are usually better suited for the purpose.

The gas purge devices of the invention are also useful in the separation of liquids entrained in gases, provided the liquid-wetted filter material is fully wetted with the liquid being separated before operation is begun, so as to ensure that gas is not emitted through the liquid-wetted line. However, if the presence of gas in this line is no problem, then, of course, this expedient can be dispensed with. In such uses, the liquid-repellent filter material will ensure that the liquid is removed from the gas, and that liquid-free gas is obtained. Such devices are useful in air purifiers, and also in chemical plants where the entrainment of liquids in the stack gases must be prevented, so as to avoid pollution of the atmosphere and damage to the surrounding countryside. In these uses, the devices of the invention are better suited than electrostatic precipitators, since they require no external power.

Having regard to the foregoing disclosure, the following is claimed as the inventive and patentable embodiments thereof:

1. A gas purge device capable of separating gases and liquids from a fluid stream thereof containing both and of delivering the gas and the liquid separately, comprising, in combination, a housing, an inlet in the housing for flow of fluid thereinto comprising gas and liquid, an outlet on one side of the housing for delivery of gas-free liquid from the housing in one direction, an outlet on another side of the housing for delivery of liquid-free gas from the housing in another direction, and a filter element having a pore size of less than about 25 microns interposed across the line of flow of the fluid stream and screening both the gas and the liquid outlets, the filter element having a liquid-repellent part screening the gas outlet, and a liquid-wetted part screening the liquid outlet, the gas-permeable liquid-repellent part and the liquid-permeable gas-impermeable liquid-wetted part being so arranged that the device can be oriented with the former up and the latter either substantially horizontal or down, the liquid-wetted part thus being positioned to be wetted and the pores thereof filled with liquid in the fluid stream, thereby blocking the flow of gas therethrough, and the liquid-repellent part thus being positioned to be reached by and the pores thereof filled with gas in the fluid stream, such that only gas can pass from the inlet through the liquid-repellent filter part across the gas outlet, and only liquid can pass from the inlet through the liquid-wetted filter part across the liquid outlet.

2. A gas purge device according to claim 1, wherein the filter element has an average pore size less than about 0.3 micron.

3. A gas purge device according to claim 1, wherein the housing and associated parts of the device are made of plastic.

4. A gas purge device according to claim 3, wherein the plastic parts are bonded or fused together in a one-piece construction.

5. A gas purge device according to claim 1, in which the housing is in the form of a Y, having one inlet and two outlet passages in respective legs, and the filter element extends across the junction of the Y, and across two leg outlet passages thereof.

6. A gas purge device in accordance with claim 1, in which the housing has a single in line through passage and the gas outlet is in one wall thereof.

7. A gas purge device in accordance with claim 6, in which the gas outlets are distributed all around the housing, and the liquid-repellent part of the filter likewise extends all around the housing.

8. A gas purge device in accordance with claim 7, in which the liquid-wetted and liquid-repellent parts of the filter material are arranged in a separated and spaced relationship in the housing.

9. A gas purge device in accordance with claim 7, in which the filter material is in the form of a thimble, having peripheral liquid-repellent portions and a liquid-wetted tip portion downstream thereof and beyond the gas outlet in the housing.

10. A gas purge device according to claim 1, wherein the volume of the housing is less than 1 cc.

11. A gas purge device according to claim 1, wherein the housing is of rigid material.

12. A gas purge device according to claim 1, wherein the housing is of transparent material.

13. A gas purge device according to claim 1, wherein the filter element has a cylindrical part with the liquid-repellent parts therein and has a liquid-wetted part extending across the open interior of the cylinder downstream of the liquid-repellent portions, beyond the gas outlet.

14. A gas purge device according to claim 1, wherein the filter material is a microporous membrane filter.

15. A gas purge device according to claim 1, wherein the filter material comprises a porous substrate coated or impregnated with a microporous fibrous layer.

16. A gas purge device according to claim 1, wherein the filter material is supported on a foraminous sheet support.

17. A gas purge device according to claim 1 in which the filter material is in the form of a disc, one segment thereof being hydrophobic and the other segment being hydrophilic.

* * * * *